United States Patent

[11] 3,578,077

[72] Inventors  Edwin E. Glenn, Jr.
　　　　　　　Dallas;
　　　　　　　Vasel R. Slover; Malcolm K. Strubhar,
　　　　　　　Irving, Tex.
[21] Appl. No.  732,460
[22] Filed  May 27, 1968
[45] Patented  May 11, 1971
[73] Assignee  Mobil Oil Corporation

[54] FLOW CONTROL SYSTEM AND METHOD
　　　9 Claims, 2 Drawing Figs.
[52] U.S. Cl. .................................................. 166/68,
　　　137/193, 137/115, 166/75, 166/267
[51] Int. Cl. ...................................................... E21b 43/00
[50] Field of Search ............................................ 137/174,
　　　173, 101.27, 115, 118, 193; 73/200; 166/267, 68,
　　　75

[56]　　　　　　References Cited
　　　　　　UNITED STATES PATENTS
2,049,405  7/1936  Brake ........................... 73/200UX Primary Examiner—Alan Cohan
Attorneys—William J. Scherback, Frederick E. Dumoulin, Drude Faulconer, Donald L. Dickerson and Sidney A. Johnson ABSTRACT: This specification discloses a method and apparatus for controlling flow of a multiphase fluid stream from a partially depleting supply source such as a pumping oil well so that the flow rate of the liquid phase thereof is maintained substantially constant. Where said source is an oil well, the multiphase fluid is pumped from the well into a separator where it is separated into its liquid and gas phases. A constant volume pump withdraws liquid from the separator at a set flow rate. A conduit connects the separator back to the well and has a valve therein which is controlled by the liquid level in the separator whereby a portion of the liquid in the separator can be returned to the well to maintain sufficient fluid in the well for the well pump to operate at its capacity.

3,578,077

EDWIN E. GLENN, JR.
VASEL R. SLOVER
MALCOLM K. STRUBHAR
INVENTORS

BY Deude Faulconer
ATTORNEY

FLOW CONTROL SYSTEM AND METHOD

BACKGROUND OF THE INVENTION

This invention relates to the control of multiphase fluid streams, and more particularly to a method and apparatus for controlling flow of a multiphase fluid stream from a partially depleting supply source such as a pumping oil well so that the flow rate of the liquid phase thereof is maintained substantially constant.

In producing an oil or gas well, it is often desirable to test the well to determine certain characteristics of the producing formation. In order to make such tests, it is sometimes necessary to control the flow rate of the produced fluids within close tolerances for a specified time while at the same time obtaining pressure data for the well. Such pressure-rate-time data is then used to compute desired formation characteristics, such as permeability and the skin effect or damage to the formation which may have occurred during completion or production of the well.

Since most produced fluids from a well contain both liquid and gas phases, difficulty is involved in accurately measuring and controlling the flow rate thereof. Several high quality positive displacement meters and mass flow rate meters are available which accurately measure single phase flow but these devices have difficulty in measuring multiphase fluid flow with the high degree of accuracy required for well testing.

To overcome this difficulty of measuring multiphase flow, separating systems have been devised wherein the multiphase fluids are first separated into gas and liquid phases. Then the flow of the liquid phase is controlled and measured through the use of a dump meter. However, a dump meter which is normally comprised of a tank which "dumps" a known quantity of liquid at periodic intervals measures liquid flow in increments and accordingly does not provide the continuous flow rate data desirable in well testing.

One control system which is capable of controlling a multiphase fluid stream from a producing well and at the same time providing the continuous flow rate data necessary for accurate well testing is that disclosed by the present inventors in their copending U.S. Pat. application No. 555,369, now Pat. No. 3,416,547 filed June 6, 1966. The system described there utilizes a separator to separate the produced fluid into liquid and gas phases. The liquid phase is then withdrawn from the separator at a controlled rate by means of a constant volume pump. The inlet to the separator is controlled by a float-actuated valve so that a desired level of liquid is maintained in the separator at all times. This insures that sufficient liquid is always present to supply adequately the constant volume pump. However, due to its operating procedure, this system is restricted primarily to use with a naturally flowing well, i.e., a well which has sufficient formation pressure to cause the flow of fluids without the aid of additional equipment.

As is well known, a great number of wells are not capable of flowing under their own pressure and must be produced by the use of pumping means. Typical pumping means are comprised of a barrel and plunger which are placed in the wellbore at the level of the production formation. The plunger is reciprocated by a cable or sucker rods which extend up the wellbore to mechanical equipment at the surface. Each stroke of the plunger is designed to produce a set volume of fluid from the wellbore. Therefore, if fluid is entering the wellbore from the production formation at a volume rate less than that of the pump or, in other words, if the source of fluid is being depleted at a rate faster than it is being replaced, the pump will "pump-off" and deliver fluid to the surface at an irregular rate. This further complicates the accurate controlling of the fluid stream even where a separator and constant volume pump are used since there is no assurance that there will be an adequate level of liquid maintained in the separator to supply the constant volume pump.

SUMMARY OF THE INVENTION

In accordance with the present invention, there is provided a new and improved method and apparatus for controlling flow of a multiphase fluid stream produced from a partially depleting fluid source such as a pumping oil well wherein the flow of the liquid phase thereof is maintained at substantially a constant rate. The invention allows continuous flow rate data to be obtained from the well without the necessity of altering the rate of the well pump.

In carrying out the present invention, a multiphase fluid stream from a producing well is pumped from the well into a gas-liquid separator. The stream is separated therein into its liquid and gas phases. A first portion of the liquid phase is produced from the separator at a constant rate by means of a constant volume pump. This rate data can be accurately recorded for use in certain well tests as described above. A second portion of the liquid from the separator is returned to the well in a controlled manner. By returning a portion of the fluid from the separator to the wellbore and adjusting flow rates accordingly, it is possible to maintain the liquid level in the wellbore at a sufficient value to allow the pump to pump its capacity on every stroke. This eliminates the possibility of the pump "pumping-off" and provides fluid from the well to the separator at a predictable rate which in turn allows an adequate level of liquid to be maintained in the separator to supply the constant volume pump.

A first embodiment of the invention is adapted to be used with a pumping well wherein the pressure within the separator is greater than the pressure within the casing annulus of the wellbore, e.g., a well which produces substantial quantities of gas. In this embodiment the fluid is returned from the separator to the wellbore by means of gravity or pressure-assisted flow. A second embodiment is adapted to be used wherein the pressure within the wellbore is greater than the pressure within the separator, e.g., a well which produces little or no gas. In this modification an auxiliary means must be used in order to force the liquid from the separator back into the wellbore.

Structurally, the first embodiment is comprised of a separator which has an inlet conduit adapted to be connected to the tubing of a pumping well. Fluid produced by the well pump flows directly into the separator where it is separated into gas and liquid phases. The separator has an upper outlet conduit through which the gas phase flows. A meter is provided in the upper outlet conduit to measure the quantity of gas which flows from the separator. A back pressure regulator is also provided in the upper outlet conduit to allow a desired operating pressure to be maintained in the separator. A lower outlet conduit is connected to the separator to allow liquid collected in the bottom thereof to be withdrawn. A first portion of the liquid is withdrawn from the separator at a constant, specified rate by means of a constant volume pump means which is connected to said lower or liquid outlet conduit. A liquid return conduit is connected either to the liquid outlet conduit at a point upstream of the constant volume pump means or to the bottom of the separator and extends from the lower outlet or the bottom of the separator back to the well. A valve is provided in the liquid return conduit which is operated by a liquid sensing means located in the separator so that as the liquid in the separator rises above a desired level, the valve opens to allow a second portion of the liquid to flow back into the wellbore. When the liquid drops below a desired level in the separator, the valve closes to maintain the liquid within the separator at the desired level.

The second embodiment of the invention, as mentioned above, is adapted to be used with a well wherein the pressure within the separator is less than the pressure within the well. This embodiment is comprised of a separator connected to the pumping well in the same manner as that in the first embodiment. The gas outlet from the separator is identical to that of the first embodiment; however, the construction of the liquid outlet varies slightly. The liquid outlet has a constant volume pump means connected therein which functions to withdraw a first portion of the liquid from the separator at a constant rate in the same manner as the constant volume pump means in the first embodiment. A liquid return conduit is connected to the liquid outlet conduit at a point upstream of the constant volume pump means or to the bottom of the separator and extends from the liquid outlet conduit or the bottom of the separator back to the well. A valve is positioned in the liquid return conduit and is controlled by a liquid sensing means positioned within the separator. In this embodiment, however, the valve closes as the liquid level rises in the separator and opens as the liquid level falls. A bypass line having a positive displacement pump therein connects a point upstream of the valve in the liquid return conduit to a point downstream of the valve in the liquid return conduit. A check valve is also provided in the liquid return conduit downstream of the point where the bypass line reenters the liquid return conduit.

In this second embodiment, a multiphase fluid stream is pumped from the well into the separator where it is separated into the gas and liquid phases. The gas phase is flowed from the upper outlet of the separator and its volume measured by appropriate means in the same manner as in the first embodiment. The constant volume pump means withdraws a first portion of the liquid from the lower outlet conduit of the separator at a constant rate, also, in the same manner as that of the first embodiment. If the liquid in the separator drops below the desired level, the valve in the liquid-return conduit opens and the positive displacement pump in the bypass line recirculates liquid in the loop formed by the bypass line and that portion of the liquid-return conduit above the check valve. No liquid is returned to the well during this time so that the liquid phase within the separator is allowed to build up. When the liquid in the separator exceeds the desired level, the valve in the liquid return conduit closes so that now the positive displacement pump, which continues to pump, builds up pressure in the liquid return conduit between the closed valve and the check valve until that pressure exceeds the pressure required to open the check valve. With the check valve open, a second portion of the liquid is pumped by the positive displacement pump back into the well thereby providing sufficient fluid in the well for the well pump to operate at capacity.

The actual construction, operation, and the apparent advantages of the invention will be better understood by referring to the drawings in which like numerals identify like parts and in which:

DESCRIPTION OF THE PREFERRED EMBODIMENT

Figure 1:
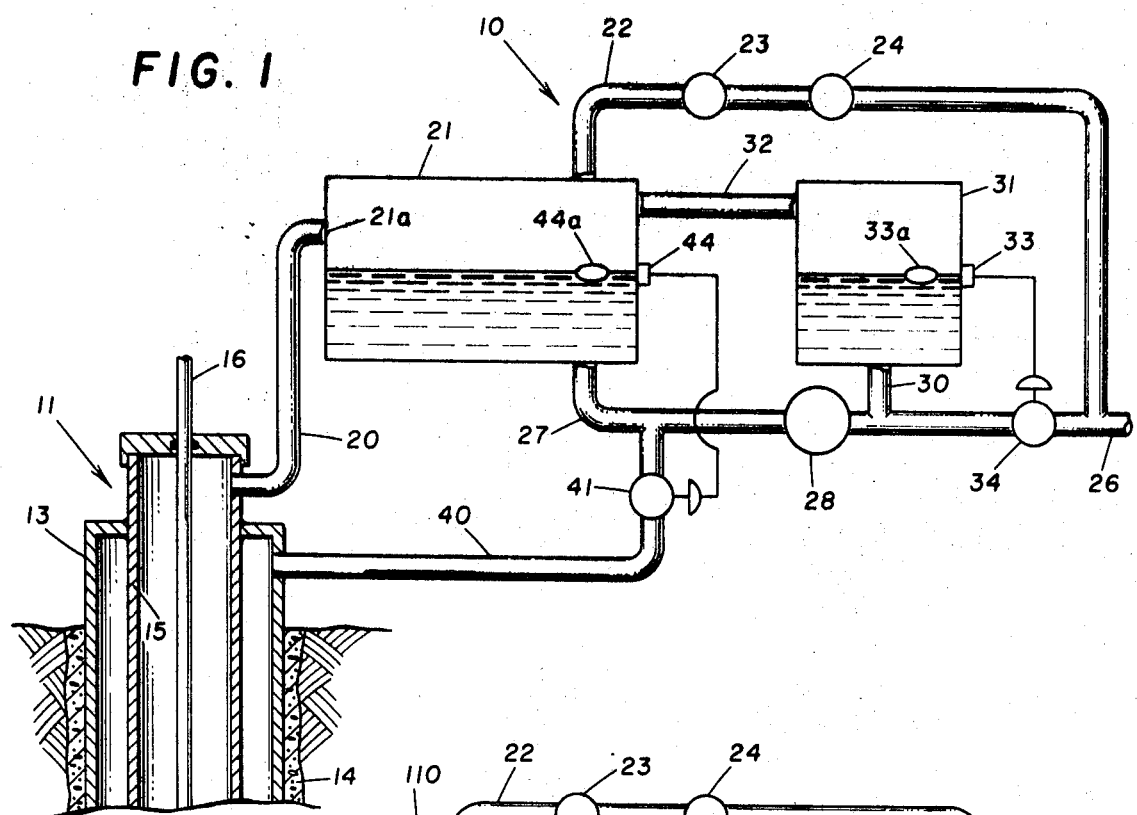
FIG. 1 is a schematic illustration of one embodiment of the invention wherein the operating pressure within the separator of the invention is greater than the pressure within the well.

Referring more particularly to the drawings, FIG. 1 discloses a flow control system 10 for controlling flow of a multiphase fluid adapted for use with a partially depleting supply source such as a pumping oil well in which the rate of fluid flow into the wellbore is less than the pumping rate of the well pump. Well 11 in FIG. 1 is illustrated as a typical oil well which has been completed in the earth 12. Only the upper portion of the well has been shown since only this part is necessary for an explanation of the present invention. Well 11 is comprised of a casing string 13 which is secured in the wellbore by means of cement 14, as is well known in the art. A string of tubing 15 is positioned concentrically in casing string 14 and extends from the surface of the well to a level near or adjacent a producing oil formation (not shown). A standard, reciprocating well pump (not shown) is positioned or connected to the lower end end of the tubing string 15 and is operable by means of a cable or sucker rod 16 which extends from the well pump pumping unit or other means (not shown) at the surface.

Inlet conduit 20 fluidly connects the interior of tubing string 15 to the inlet 21a of separating means 21. Separating means 21 is preferably a liquid-gas separator of the "flash separation" type in which a gas-liquid mixture expands upon entering the separator to liberate gas from solution in the liquid phase. The gas phase occupies the upper portion of separator 21 and the liquid occupies the lower portion thereof. An upper gas outlet 22 is connected to the top of separator 21 and extends to production line 26. Gas outlet conduit 22 is provided with gas metering device 23 which may be of any suitable type, such as (a) an orifice meter which measures and records the gas flow rate through an orifice plate, or (b) a cumulative type meter which merely records a cumulative volume of gas withdrawing through outlet line 22. A typical example of a gas flow meter which may be used is of the type manufactured by The Foxboro Company, Foxboro, Mass., and is available as their Model No. 37.

Downstream of meter 23 in gas outlet line 22 is back pressure control valve 24 which may be adjusted to control the operating pressure in separator 21 at any desired value within a suitable range, e.g., a range of 0 p.s.i. gauge (atmospheric pressure) to 300 p.s.i. gauge. Although any back pressure valve of this type may be used, a typical example of such a valve is a Fisher Governor Company, Model No. 125P valve equipped with a Fisher Governor Company Model No. 4100 pressure sensor and controller.

A liquid outlet conduit 27 is connected to the bottom of separator 21 and has therein a constant volume, variable speed pump 28 preferably of the positive displacement type, which functions to control the withdrawal of liquid from the separator at any specified rate within a suitable range. As will be explained hereinafter, the pump 28 may be calibrated in terms of output versus pump speed in order to provide a metering function as well as a control function. An example of a pump that may be used is a variable-displacement, rotary, positive-displacement pump capable of pumping a constant volume at given rate and which is available from Blackmer Pump Company, Grand Rapids, Mich., and identified as Model VX. The prime mover for the pump may be a variable speed electric motor.

At a point downstream of pump 28, liquid outlet conduit 27 has connected thereto a standpipe 30 which in turn leads to a vessel 31 which is adapted to contain fluid, thereby imposing a back pressure on pump 28 and minimizing the pressure drop across said pump. Vessel 31 is provided with the means for varying the gas pressure therein directly with a change in the gas pressure within the gas separator 21. As shown in the drawing, this preferably takes the form of a gas line 32 interconnecting the gas zone of separator 21 and the gas zone of vessel 31 so that the same gas pressure is maintained in both separator 21 and vessel 31. The vessel 31 also is provided with suitable means 33 for maintaining a substantially constant level of liquid therein. This means as shown in FIG. 1 comprises a liquid level sensing device 33 with a float 33a and a float regulating diaphragm valve 34 positioned in the discharge line of the pump 28 at a point downstream of the interconnection of the discharge line and the standpipe 30. One typical example of a valve that can be used is one obtained from Fisher Governor company, Marshalltown, Iowa, Model No. 125P. A typical level sensor including the float and attendant pilot valve are available from the W. C. Norris Division, Dover Corporation, Houston, Tex., as their series 1,000 –level controls.

Before utilizing the system in FIG. 1 in the control monitoring of a fluid steam such as in the testing of an oil well, it will be desired to calibrate the pump 28 on the basis of pump speed and flow rate. This may be accomplished by manually closing valve 34 and then pumping liquid from the separator 21 to vessel 31 and measuring the time required for a known amount of liquid to accumulate within the vessel 31.

Connected to liquid outlet conduit 27 at a point upstream of the pump 28 is a liquid return conduit 40. Return conduit 40 extends from liquid outlet conduit 27 back to the well and is fluidly connected to the interior of casing 13. Connected in liquid return conduit 40 is a flow control valve 41 which is of the same type as that described in relation to valve 34. A liquid level sensing means 44 is mounted on separator 21 and has a float means 44a which extends into separator 21 as a part thereof. This liquid level sensing device is of the same basic type as liquid level sensing device 33. Liquid level sensing means 44 is operably connected to valve 41 so that as the liquid level within the separator rises, float 44a will actuate valve 41 to open said valve and allow fluid to flow from liquid outlet conduit 27 through liquid return conduit 40 into casing 13 in the well and to close said valve when the liquid level falls to allow a desired level of liquid to be maintained in separator 21 at all times. Although liquid return conduit 40 is shown as being connected to liquid outlet conduit, it could also be directly attached to the bottom of the separator without affecting its operation.

The operation of control system 10 shown in FIG. 1 is as follows. A multiphase fluid stream is pumped from the tubing 15 os well 11 through inlet conduit 20 into separator 21. As the gas entrained in the oil expands upon entry into the separator 21, it is liberated therefrom and occupies the upper portion of the separator. The separate gas phase flows from the separator 21 through gas outlet conduit 22 and passes through metering device 23 and back pressure regulating valve 24. Back pressure valve 24 is set to allow the gas phase to collect in the separator until a desired operating pressure within the separator 21 is established. This pressure should be a pressure equal to or preferably greater than the pressure existing in casing 13 of well 11. This pressure in the separator assists the return of liquid to the well as will be explained below. A first portion of the liquid phase which accumulates in the bottom of separator 21 is removed through liquid outlet conduit 27 at a controlled rate by means of constant volume pump 28. As noted previously, the constant volume pump 28 may be calibrated such that the operation of said pump at known speed will produce a known flow rate so that the pump functions to meter as well as to control the withdrawal of liquid from separator 21. This constant rate will be set at a value which allows a desired liquid level to be maintained in separator 21.

As the liquid level within the separator 21 rises, float 44a will actuate valve 41 to open said valve and allow a liquid from the separator to flow through liquid return conduit 40 back into casing 13 of the well. This allows a second portion of the liquid within separator 21 to be returned to well 11 and assures that the volume of fluid available in the well is sufficient to allow the well pump (not shown) to operate continuously at its capacity. The pressure in the separator, being equal to or greater than that in casing 13, will allow the liquid to return to the well by means of gravity or pressure assisted flow. If fluid is returned to the well at too great a rate, the liquid level within the separator will fall, which in turn causes float 44a to close valve 41 to allow the liquid in separator 21 to be maintained at a desired, reference level.

Vessel 31 and its attendant control equipment function to maintain a substantially constant and, if desired, a relatively minimum pressure drop across the pump. This allows constant volume pump 28 to operate at a relatively competent and high level efficiency and assures that for any given constant pump speed the flow rate through the pump will be constant within a very low tolerance range. Liquid level control means 33 may be set to maintain the liquid within the vessel 31 at any desired level, although preferably the level within vessel 31 will be maintained at a level not greater than that within the separator 21. Thus, the hydrostatic heads imposed upon the inlet and outlet sides of pump 28 will be substantially the same. It will be recognized, however, that if it is desired to increase the pressure differential across pump 28, liquid level control means 33 may be positioned such as to maintain a liquid within vessel 31 at some level below the level in the separator 21.

As noted previously, gas flow line 32 functions to equalize gas pressure within separator 21 and vessel 31. That is, the gas pressure within vessel 31 will be the same as the operating pressure within separator 21, neglecting the pressure loss due to the gas flow through line 32.

In some instances, gas flow line 32 may be unnecessary. For example, where separator 21 is operating at a very low pressure, the pressure exerted on the input side of the pump will be due largely to the hydrostatic head of liquid within separator 21. In this case, gas flow line 32 may be dispensed with.

Conversely, where the separator is operating under a very high pressure, e.g., on the order of 300 pounds or more, most of the pressure exerted on the input side of pump 28 will be due to the gas pressure within separator 21. In this case, level control means 33 in vessel 31 may be eliminated since the hydrostatic pressure on pump 28 is only a very small part of the total pressure exerted thereon. It will be recognized, however, that in this case some gas will flow through line 32 and standpipe 30 and then to the outlet line 27, thus bypassing metering device 24. For this reason, it will usually be preferred to maintain a level of liquid within vessel 31 such as shown.

Figure 2:
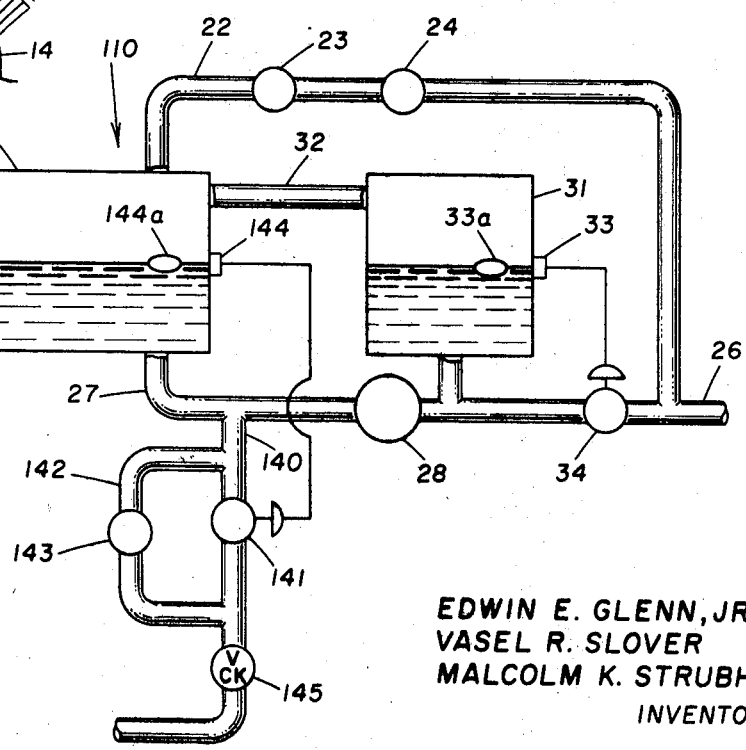
FIG. 2 is a schematic illustration of a portion of a second embodiment of the present invention wherein the operating pressure within the separator of the invention is less than the pressure within the well.

Turning now to FIG. 2, there is shown a second embodiment of the control system in which the operating pressure within the separator of the system is at a pressure less than that present in the casing of the pumping well. The system shown in FIG. 2 is in many respects similar to that shown in FIG. 1 and like elements will be identified by the reference numerals used in FIG. 1.

Flow control system 110 is comprised of separating means which is connected to partially depleting supply source such as the pumping well shown in FIG. 1 by means of an inlet conduit 20. Separating means 21 which is identical to that of FIG. 1 has a gas outlet conduit 22 with metering means 23 and back pressure valve 24 connected to the top thereof to measure the gas phase as it flows from separator 21. These components function as they did in the first embodiment. Outlet conduit 27, constant volume pump 28, back pressure maintenance vessel 31, and flow control valve 34 also are identical in structure and function to those shown in FIG. 1 so no further description in regards thereto is considered necessary.

Flow controller 110 differs from flow controller 10 in that a different liquid return system is utilized to return liquid from separator 21 to the casing of the well. Liquid return conduit 140 is connected to liquid outlet 27 and extends from the liquid outlet to the casing of a pumping well similarly as shown in FIG. 1. A flow control valve 141 is mounted in the liquid return conduit and is of the same basic type as valve 41 in FIG. 1 with the exception that it mode of operation is reversed, as will be explained below. Liquid level sensing means 144 is mounted on separator 21 and has a float 144a extending into the separator. This control is designed so that as the liquid level in separator 21 falls, the valve 141 will be opened and as the liquid level rises in the separator the valve 141 will be closed.

A bypass line 142 is provided in the liquid return conduit 140 and connects a point upstream of valve 141 to a point downstream of the valve 141 thereby bypassing valve 141. Mounted in bypass line 142 is a positive displacement pump 143 for a purpose described below. A check valve 145 is provided in liquid outlet conduit 140 downstream of the bypass line 142 and is adapted to open to allow flow from separator 21 to the casing in the well when pressure exerted by the liquid in outlet conduit 140 exceeds a predetermined value. Again, liquid return conduit 140 is shown as being connected to liquid outlet line 27 but it could be connected directly to the bottom of separator 21 without affecting the operation thereof.

The general operation of the embodiment of FIG. 2 is basically the same as that in FIG. 1 except for the liquid return mechanism of FIG. 2 which is necessitated when the operating pressure in separator 21 cannot be maintained equal to or greater than the pressure in the casing of the well. The operation of the embodiment of FIG. 2 is as follows. Fluid is pumped from a pumping well (not shown) through inlet 20 into separator 21 where it breaks into its liquid and gas phases. The gas phase passes through outlet 22 and is metered by the appropriate measuring means 23. Constant volume pump 28 withdraws and meters liquid from the lower portion of separator 21 in the same manner as previously described. If the liquid level in separator 21 drops a desired value, float 144 actuates valve 141 to open said valve 141. This allows positive displacement pump 143 to circulate fluid in liquid return conduit 140 around the loop formed of bypass line 142 and that portion of return conduit 140 connecting the ends of bypass line 142 through the valve 141. Check valve 145 is set so that it remains closed whenever valve 141 is open. If the liquid level in the separator begins to rise, float 144a will actuate valve 141 to move same toward a closed position so that pump 143 no longer circulates liquid therethrough. With valve 141 closed, pressure builds up in the portion of the bypass line and liquid return conduit between closed valve 141 and the positive displacement pump 143 until the pressure is sufficient to open check valve 145 which in turn allows liquid to be returned by pump 143 from separator 21 back to the well.

Although the embodiments of the present flow control system have been described in connection with a pumping oil well, it should be realized that these embodiments could be used in other environments where a multiphase fluid flow is being controlled from a partially depleting fluid source where it is desirable to circulate part of the liquid phase of the multiphase fluid back to said source. The foregoing disclosure relates only to the preferred embodiment of the invention and is intended to cover all changes and modifications therein which do not constitute departure from the spirit and scope of the invention.

We claim:

1. In a flow control system adapted to be used in controlling flow of a multiphase fluid from a partially depleting supply source, the combination comprising:
    means for separating said fluid into liquid and gas phases, said separating means having an inlet adapted to be connected to said partially depleting supply source to receive said multiphase fluid therefrom and having a liquid outlet conduit means for passage of the liquid phase therefrom;
    means connected in said liquid outlet conduit means for withdrawing a first potion of said liquid phase from said separating means at a specified rate;
    return conduit means fluidly connected at one of its ends to said separating means and adapted to be connected at the other of its ends to said partially depleting supply source;
    means in said separating means for sensing the level of said liquid phase therein; and
    valve means in fluid communication with said return conduit means and responsive to said level sensing means for permitting liquid flow through said return conduit means from said separating means to said partially depleting supply source when said level rises above a reference level whereby a second portion of said liquid phase may be returned to said partially depleting supply source.

2. The system of claim 1 wherein said valve means comprises:
    a valve in said liquid return conduit means operably connected to said level sensing means and responsive thereto whereby said valve moves toward an open position as the liquid level rises above a reference level in said separating means and moves toward a closed position as the liquid level drops below said reference level.

3. The system of claim 1 wherein said valve means comprises:
    a first valve in said liquid return conduit means operably connected to said level sensing means and responsive thereto whereby said first valve moves toward a closed position as the liquid level in said separating means rises above a reference level and moves toward an open position as the liquid level drops below said reference level;
    bypass line means for fluidly connecting a point on said liquid return conduit means upstream of said first valve means to a point on said liquid return conduit means downstream of said first valve whereby said bypass line means and the portion of said liquid return conduit means between said points form a loop;
    means in said bypass line means for pumping liquid therethrough; and
    a second valve in said liquid return conduit means downstream of said loop adapted to close whenever said first valve opens so that said pump means in said bypass line means will circulate liquid through said loop when said liquid level in said separating means falls below said reference level, said second valve adapted to open whenever said first valve closes so that said pumping means in said bypass line means will return liquid to said partially depleting supply source when said liquid level in said separating means rises above said reference level.

4. The system of claim 1 wherein:
    said separating means has a second outlet conduit means adapted for flow of said gas phase from said separating means.

5. The system of claim 4 wherein said second outlet conduit means includes:
    means for measuring gas phase flow from said separating means;
    means for maintaining the pressure within said separating means at a desired value.

6. The system of claim 2 wherein:
    said separating means has a second outlet conduit means adapted for flow of said gas phase from said separating means, said separating means including:
    means for measuring said gas phase flow from said separating means; and
    means for maintaining the pressure within said separating means at a desired value.

7. The system of claim 6 wherein said means for withdrawing a portion of said liquid phase at a specified rate comprises:
    a constant volume pump.

8. The system of claim 7 including:
    a vessel connected to said liquid outlet conduit downstream of said pump, said vessel adapted to contain liquid whereby a back pressure may be maintained on said pump.

9. The system of claim 1 including:
    means connecting said inlet of said separating means to said partially depleting supply source wherein said source is an oil well having a well pump therein which produces said multiphase fluid from said well at a rate greater than it is replaced therein.